April 6, 1937. C. E. REED 2,075,998
ROLLER CUTTER ASSEMBLY FOR EARTH BORING DRILLS
Original Filed July 30, 1935
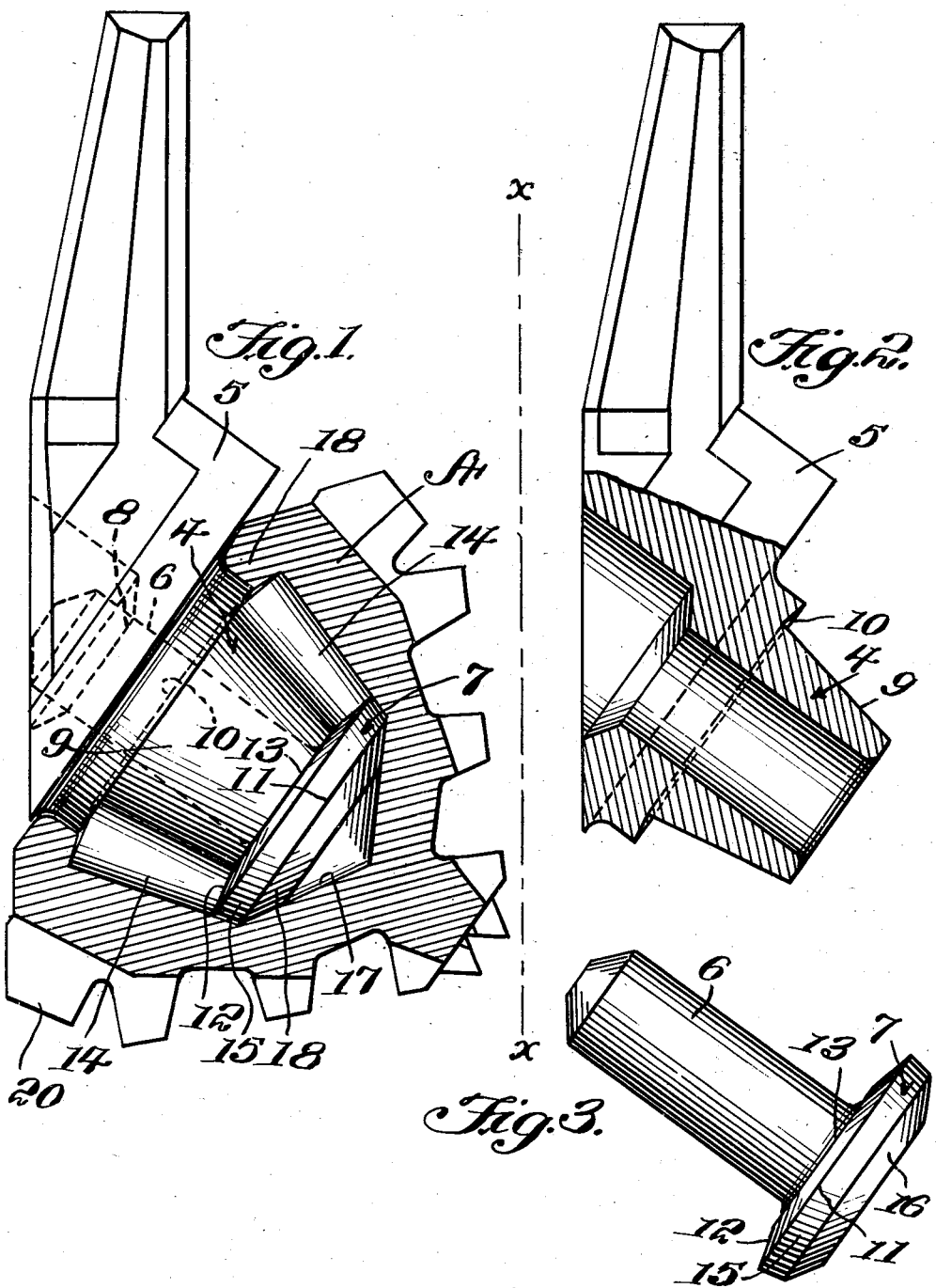

Patented Apr. 6, 1937

2,075,998

UNITED STATES PATENT OFFICE 2,075,998

ROLLER CUTTER ASSEMBLY FOR EARTH BORING DRILLS

Clarence E. Reed, Wichita, Kans., assignor to Chicago Pneumatic Tool Company, New York, N. Y., a corporation of New Jersey Application July 30, 1935, Serial No. 33,882
Renewed September 14, 1936

6 Claims. (Cl. 255—71)

The invention relates to earth boring drills employing roller cutters and anti-friction bearings between the same and the spindles mounting said cutters.

The invention is particularly adapted for roller bits of small diameter though it is not limited in this regard.

In the accompanying drawing

Figure 1 is a view of a roller cutter, spindle and bearing assembly, the cutter being shown in longitudinal section.

Fig. 2 is a detached view of the main section of the spindle, together with its support.

Fig. 3 is a detached view of the terminal section of the spindle.

The main section 4 of the spindle is formed integrally with its support or bracket 5, which latter is adapted to be secured to the drill head. The spindle inclines downwardly from this support and inwardly towards the vertical axis of the drill.

This main spindle section has an axial bore receiving a stem or shank 6 of a terminal spindle section 7, the said stem being welded to the spindle support at 8. The main spindle section is in the form of a frustum of a cone, its base or portion of larger diameter joining integrally a shoulder 9, integral with the support 5.

The annular side face of the shoulder is slightly undercut as indicated at 10, and the periphery of said shoulder, being substantially cylindrical.

The terminal section of the spindle has a flange 11, the outer side face 12 of which is bevelled to the point where it intersects the frusto-conical face of the main section of the spindle from which point this face of the flange extends annularly as at 13 in a plane at right angles to the axis of the spindle, said face 13 being adapted to abut against the end face of the main section of the spindle. This flange provides the shoulder or end wall defining the inner side of a raceway for roller bearings 14 of elongated frusto-conical form. The smaller diameter end of these tapered rollers bear on the bevelled face 12 of the flange, while their larger diameter ends bear on the surface or wall of the undercut space 10 in the side face of the shoulder 9 at the base of the frusto-conical main section of the spindle. For making contact with the wall of this undercut space, the base or larger end face of the conical roller may be slightly conical. The peripheral face 15 of the flange or head of the terminal section of the spindle is of substantial breadth and conforms in taper or incline to the wall of the generally tapered bore of the frusto-conical cutter, shown at A. The inner face 16 of the flange or head of the terminal spindle section is sharply bevelled and provides a friction bearing face contacting with the wall of the tapered bore 17 at the apex end of the frusto-conical cutter. End thrust of the rotary cutter outwardly towards the support 5 is taken largely by these friction surfaces 16 and 17 on the terminal spindle section and cutter respectively, and end thrust of the cutter outwardly is also taken by the conical roller bearings. The cutter is provided with an annular flange 18 at its base extending inwardly from its main bore and overlapping about half way the larger diameter ends of the conical roller bearings. This construction results in locking the roller cutter rotatively on the spindle, the conical rollers providing anti-friction bearings and also the locking means. Ordinarily the working loads imposed on the frusto-conical cutter subject it to end thrust outwardly towards the support 5 and therefore away from the vertical axis of the drill indicated by the dotted line $x-x$, and these outward stresses maintain the cutter on the spindle and its roller bearings, but under abnormal conditions, the roller cutter might tend to slip off from the spindle and the roller bearings will resist this tendency as well as hold the cutter in place while the apparatus is being introduced into the well, or removed therefrom.

At their smaller diameter ends the roller bearings find a bearing against the flange or head of the terminal spindle section substantially throughout the diameter of their end faces. At their larger ends the roller bearings contact with the undercut shoulder for about one half their diameter.

The roller cutter is provided with a base zone 20 of comparatively wide cutting teeth, whereas the cutting teeth on the conical zone of the cutter are in circumferential rows widely spaced apart, the two zones being at an obtuse angle to each other. As usual, in this type of drill the cutter substantially encloses the free end of the spindle.

In assembling the unit, the terminal spindle section is placed in the cutter resting upon the end wall of its bore within the apex portion thereof. Then the conical roller bearings are placed in the bore of the cutter resting upon the tapered wall of said bore, and the small ends of the rollers rest upon the bevelled side face of the flange or head of the terminal spindle section. The assembly thus far made can be accomplished because there is ample room between the stem of the terminal section and the wall of the cutter bore to move the conical rollers into said bore until they register with the space between the base flange of the cutter and the flange of the terminal spindle section, whereupon the conical rollers can be moved out radially of the unit to their seat against the wall of the cutter, and with the flange 18 at the base of the cutter overlapping their ends, suitable grease being used to make the rollers stick in place. Next the main section of the spindle is moved in an axial direction to the position shown in Fig. 1 with its conical runway surface contacting with the roller bearings, and with its end face bearing upon that face 13 of the flange which lies in a plane at right angles to the axis of the spindle. The welding is then performed securing the spindle sections together through the medium of the support 5.

I claim:

1. An earth boring drill having a main spindle section and a support therefor, said main spindle section tapering from the support to its end, a terminal spindle section having a head or flange, a portion of which contacts with the end face of the main spindle section, and a portion of which flange is of larger diameter than the small diameter end of the main spindle section, a stem on the terminal section seated in a bore of the main spindle section, a cutter having a runway surface complementary to the surface of the tapered main spindle, a shoulder at the base of the main spindle section, and tapered anti-friction rollers between the cutter and the main spindle section bearing on the complementary runway surfaces of the main section and the cutter, the small diameter ends of said rollers contacting a bevelled side face of the flange of the terminal spindle section, and the large diameter ends of said rollers contacting the shoulder at the base of said main section, the roller cutter having a flange contacting the faces of the larger diameter ends of the rollers, substantially as described.

2. A roller cutter organization according to claim 1 in which the flange of the terminal section of the spindle has a friction bearing surface taking end thrust of the roller cutter, substantially as described.

3. A roller cutter assembly according to claim 1 in which the stem of the terminal spindle section and the bore of the cutter at its base are of relative diameter to permit the insertion of the roller bearings into place, and the subsequent placing of the main section of the spindle in operative position with the rollers contacting its tapered surface, substantially as described.

4. A roller cutter unit for earth boring drills having anti-friction rolling bearing consisting of only a single row of conical rollers, a main spindle section and a roller cutter having complementary conical raceway surfaces conforming to said conical rollers, a shoulder on the main spindle section against which the larger diameter ends of the rollers bear, and a terminal spindle section formed separate from the main section, but fixed relative thereto, and having a flange affording an end bearing for the small ends of the rollers, said flange having an annular bevelled face on one side intersecting another annular face at an angle thereto, said faces contacting respectively the ends of the rollers and the end of the main spindle section, said flange having on its other side a friction bearing surface contacting a complementary surface in the apex bore of the cutter to take end thrust of said cutter outwardly towards the base of the main spindle section, substantially as described.

5. A roller cutter organization for earth boring drills comprising a support having an integral main spindle section on an axis inclining downwardly and inwardly towards the vertical axis of the drill, and of frusto-conical form, a terminal spindle section having a head or flange of larger diameter than the smaller diameter end of the frusto-conical main section, conical rollers on said frusto-conical main section with their smaller ends bearing upon said flange and with their larger ends bearing upon a shoulder at the larger diameter end of the main section, and a roller cutter having the wall of its bore complementary to the surface of the main section and affording a raceway for the frusto-conical rollers, said cutter having a flange overlapping the larger diameter end faces of the frusto-conical rollers, substantially as described.

6. A roller cutter organization according to claim 4 in which the shoulder at the larger end of the main section is undercut to receive the ends of the roller bearings, substantially as described.

CLARENCE E. REED.